May 23, 1961  E. RATH  2,985,115
VEHICLE ASSEMBLIES
Filed July 21, 1958  2 Sheets-Sheet 1
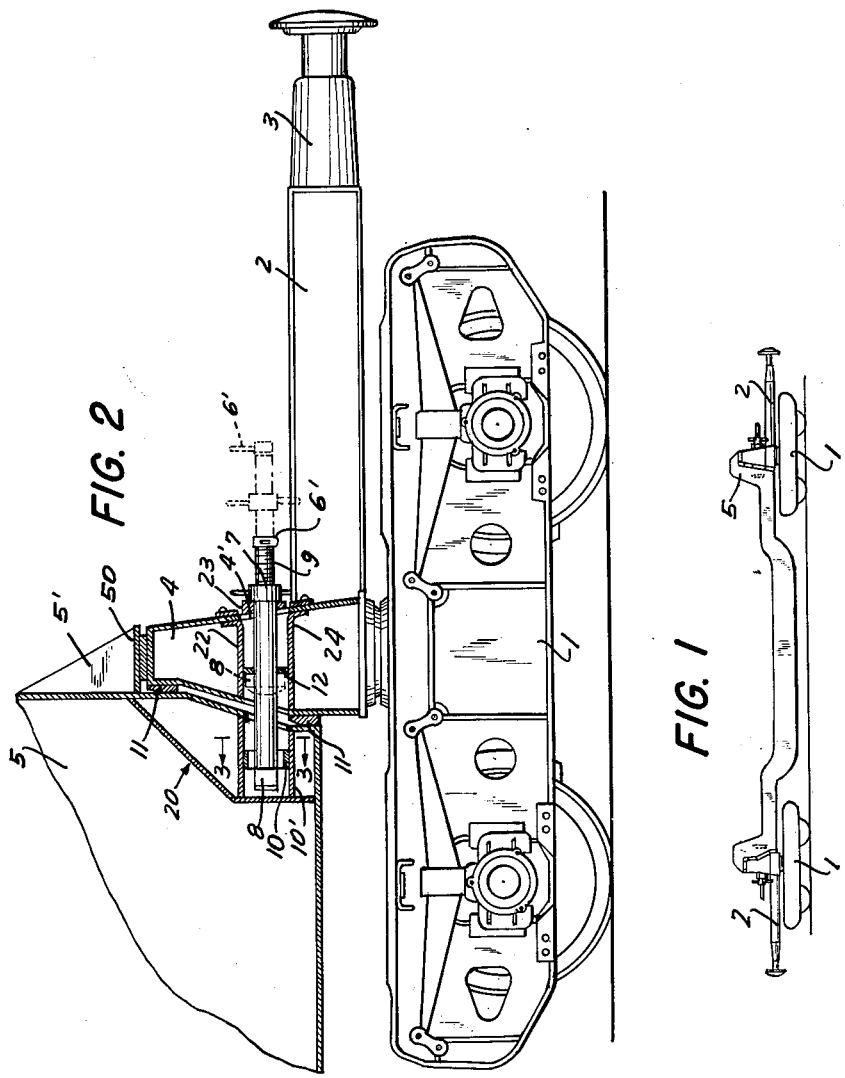
INVENTOR.
Erich Roth
BY Michael S. Striker
Attorney May 23, 1961  E. RATH  2,985,115

VEHICLE ASSEMBLIES

Filed July 21, 1958  2 Sheets-Sheet 2

INVENTOR.
Erich Rath
BY Michael S. Striker
Attorney

United States Patent Office 2,985,115
Patented May 23, 1961

2,985,115

VEHICLE ASSEMBLIES

Erich Rath, Dortmund, Germany, assignor to Orenstein Koppel und Luebecker Maschinenbau Aktiengesellschaft, Dortmund, Germany Filed July 21, 1958, Ser. No. 749,784

8 Claims. (Cl. 105—159)

The present invention relates to vehicle assemblies.

More particularly the present invention relates to vehicle assemblies wherein an elongated carrier is supported by a pair of carriages which are spaced from each other and which form together with the carrier a single vehicle which is movable along a railroad track, for example.

One of the objects of the present invention is to provide in a vehicle assembly of the above type a means for quickly and reliably connecting and disconnecting a carrier to and from a pair of carriages, respectively.

Another object of the present invention is to provide in a vehicle assembly of the above type a connection between the elongated carrier and the pair of carriages which is capable of reliably absorbing both compressive and tensile forces.

A further object of the present invention is to provide in a vehicle assembly of the above type a coupling means which interconnects the carrier with each carriage and which is subject only to tensile forces. Conventional coupling means of this type are subject both to tensile and compressive forces, and when such a coupling means is conventionally designed only the tensile forces are taken into consideration so that the coupling does not operate properly when it is subject to compressive forces. With the present invention, however, by providing an arrangement where the coupling means is subject exclusively to tensile forces, it is capable of being properly designed.

It is also an object of the present invention to provide structure capable of accomplishing all of the above objects and at the same time composed of simple and inexpensively constructed elements which are very reliable in operation.

With the above objects in view, the present invention includes in a vehicle assembly an elongated carrier and a carriage on which the carrier rests at least in part. The carrier has an end distant from the carriage and the carriage has an upstanding portion. Between this upstanding portion and its end distant from the carriage the carrier has a connecting portion. An elongated rod has one end located at the connecting portion of the carrier and extends through the upstanding portion of the carriage to the side of this upstanding portion which is directed away from the connecting portion of the carrier, and at this side of the upstanding portion of the carriage the rod is threaded. A means is carried by the connecting portion of the carrier and cooperates with the end of the rod located at this connecting portion of the carrier to prevent movement of this end of the rod toward the upstanding portion of the carriage, and a nut means is threadedly carried by the threaded portion of the rod and cooperates with the side of the upstanding portion of the carriage which is directed away from the connecting portion of the carrier so as to place the rod under tension for interconnecting the carrier with the carriage. An abutment means cooperates with the carriage and with the carrier for limiting the movement of the connecting portion of the carrier and the upstanding portion of the carriage toward each other, and as a result the rod is subject only to tensile forces when the carriage and end of the carrier distant from the carriage tend to move apart from each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic side elevational view of a vehicle assembly according to the present invention;

Fig. 2 is a fragmentary partly sectional elevational view on an enlarged scale showing the connection between the carrier and one of the carriages;

Figure 3:
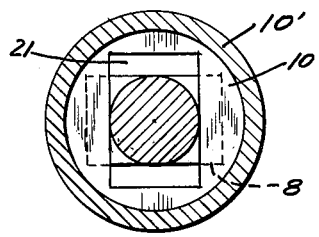
Fig. 3 is a transverse sectional view taken along line III—III of Fig. 2 in the direction of the arrows.

Referring now to the drawings, Fig. 1 shows a pair of carriages each of which includes a lower part 1 capable of rolling along a pair of rails of a railroad track, for example, and an upper part 2 turnable with respect to the lower part 1 about a vertical axis, so that in this way the vehicle is capable of maneuvering turns. On the turnable parts 2 of the carriages 1, respectively, rests an elongated carrier 5 which may be in the form of an elongated platform adapted to carry goods such as transformers, cable rolls, paper cylinders, and the like, or the elongated carrier may be in the form of an elongated hollow container in which loose goods such as ore, coal, coke, and the like may be transported.

The manner in which the carrier 5 cooperates with each of the carriages 1, 2 is illustrated in detail in Fig. 2. Thus, referring to Fig. 2, it will be seen that the right end of the carrier 5 is shown in Fig. 2 in cooperation with the right carriage 1, 2. As was pointed out above, the upper portion 2 of the carriage is turnable with respect to the lower part 1 about a vertical axis, and this lower part 1 includes two pairs of wheels rollable along the tracks of a railroad track, for example, and also suitable brakes may be carried by the lower part 1 of the carriage for cooperating with the wheel. As is apparent from a comparison of Figs. 1 and 2, the left end of the carrier 5, as viewed in Fig. 1, is distant from the right carriage 1, 2 shown in Figs. 1 and 2, while the right end of the carrier 5 is located adjacent to the right carrier 1, 2.

As may be seen from Fig. 2, the carriage 1, 2 includes an upstanding portion 4, and at its right end the portion 2 of the carriage 1, 2 is provided with a well known means 3 for interconnecting the vehicle with another vehicle of a train of vehicles so as to move with the train, and this part 3 is also capable of absorbing shocks when the train stops and starts.

The upstanding portion 4 of the carriage 1, 2 is located adjacent to a connecting portion 20 of the carrier 5, this connecting portion 20 being located between the upstanding portion 4 and the end of the carrier 5 which is distant from the carriage 1, 2.

An abutment means is provided to limit the movement of the connecting portion 20 of the carrier 5 and the upstanding portion 4 of the carriage 1, 2 toward each other. This abutment means includes in the example illustrated in Figure 2 a pair of plates 11 which are fixed, as by welding, or the like, to the left end surface of the upstanding portion 4 of the carriage 1, 2 and which abut directly against the right surface of the connecting portion 20 of the carrier 5, as viewed in Fig. 2. Thus, these plates 11 limit the movement of the upstanding portion 4 and the connecting portion 20 toward each other, and as a result this abutment means limits the movement of both of the carriages toward each other.

The carrier 5 is separable from the carriages, and when it is joined to the carriages it is simply lowered into the position indicated in Fig. 1 between the carriages, and in this position the ends of the carrier 5 rest on the upstanding portions 4 and abut against the plates 11 which are fixed to the upstanding portions 4.

A coupling means is provided for interconnecting the connecting portions 20 with the upstanding portion 4 and for absorbing those forces which tend to move the upstanding portion 4 and the connecting portion 20 away from each other. This coupling means includes the elongated rod 6 which has at its left end, as viewed in Fig. 2, a cross bar 8 fixed to and extending transversely with respect to the axis of the rod 6, so that at its left end the rod 6 has a substantially T-shaped configuration. This cross bar 8 is elongated and may be of an oval or rectangular configuration. At the side of the upstanding portion 4 which is directed away from the connecting portion 20, the rod 6 is provided with a threaded portion 9 which receives a nut 7, and this nut may be provided with radially extending projections or the like to facilitate the turning of the nut 7 by the operator. At its right side, as viewed in Fig. 2, the upstanding portion 4 fixedly carries a plate 4' engaged by the nut 7, this plate 4' having a vertical right end face, as viewed in Fig. 2, so that the nut 7 will cooperate properly with the upstanding portion of the carriage 1, 2. As was pointed out above the upper portion 2 of the carriage which is provided with the upstanding portion 4 is turnable about a vertical axis with respect to the lower portion 1 of the carriage so that the vehicle is capable of moving along curved parts of the track.

A means is provided for preventing movement of the cross bar 8 to the right, as viewed in Fig. 2 toward the upstanding portion 4 of the carriage 1, 2, and this means includes the stop member 10 which is fixedly carried by the connecting portion 20 in a hollow tubular part thereof which has an open right end, as viewed in Fig. 2, so that when the vehicle components are connected the rod 6 together with its cross bar 8 can pass freely into this tubular portion up to the stop member 10. This stop member 10 is formed with an elongated cutout of the same configuration as the cross bar 8, so that when the cross bar 8 is aligned with this cutout the cross bar 8 can be slipped through the cutout to become located at the left side of the stop member 10, as viewed in Fig. 2, and thereafter the operator turns the rod 6 about its axis through approximately 90° so that the free ends of the cutout 8 which extends laterally beyond the remainder of the rod 6 will engage the left end face of the stop member 10, as viewed in Fig. 2, to prevent movement of the rod 6 to the right, as viewed in Fig. 2, and the rod 6 is thus reliably maintained in the connecting position thereof which is indicated in Fig. 2. Once the rod 6 has been axially shifted from a disconnecting position where the end 8 of the rod 6 is located at the upstanding portion 4 of the carriage 1, 2 to the connecting position shown in solid lines in Fig. 2, and after the rod 6 has been turned through 90° so that the cross bar 8 cooperates with a stop member 10 to prevent shifting of the rod 6 back to its disconnecting position, the nut 7 is tightened, and in this way the plates 11 are tightly clamped between portion 20 of the carrier 5 and the upstanding portion 4 of the carriage 1, 2, and the carrier 5 and carriage 1, 2 are now reliably connected with each other. It will be noted that with this arrangement all forces which tend to move portions 4 and 20 toward each other will be absorbed by the plates 11 and will not be transmitted to the rod 6.

Only forces tending to move portions 4 and 20 away from each other will be absorbed by the rod 6, so that the coupling means of the present invention is subject only to tensile forces.

The rod 6 may be provided at its right end, as viewed in Fig. 2, with a radially extending projection 6', which facilitates turning of the rod 6 about its axis by the operator.

Fig. 3 shows the stop member 10 in the elongated tubular portion 10' of the connecting portion 20 of the carrier 5, and as is apparent from Fig. 3, in the illustrated example the cut out 21 of the stop member 10 is of a rectangular configuration which is the same as the rectangular configuration of the cross bar 8 fixed to the end of the rod 6, so that these parts will cooperate in the manner described above.

The upstanding portion 4 of the carriage 1, 2 is provided with an elongated tubular portion 22 coaxial with the tubular portion 10' and also having an open left end through which the cross bar 8 together with the remainder of the rod 6 may freely pass. Within this tubular portion 22 the upstanding portion 4 of the carriage is provided with a stop member 12 having a cutout of the same configuration as the cutout 21 shown in Fig. 3 but displaced by 90° with respect to the cutout of the stop member 10, so that the rectangular cutout of the stop member 12 will extend horizontally in the example illustrated in Fig. 2. Thus, when the rod 6 is introduced into the tubular portion 22 of the upstanding portion 4 of the carriage the cross bar 8 must be aligned with the cutout of the stop member 12 before being able to pass therethrough, and then it is necessary to turn the rod 6 so as to align the cross bar 8 with the cutout 21 of the stop member 10 in order to pass the cross bar 8 through the cutout 21. When performing the reverse of these operations which is to say when it is desired to disconnect the carrier 5 from the carriage shown in Fig. 2 the nut 7 is loosened, the rod 6 is turned about its axis to approximately 90° so as to align the cross bar 8 with the cutout 21 of the stop member 10, and then the rod 6 is axially shifted to the right, the cross bar 8 moving through the cutout 21, through the right open end of the tubular portion 10', then through the left open end of the tubular portion 22 of the upstanding portion 4 of the carriage, and finally into engagement with stop member 12. It will not be possible for the cross bar 8 to move through the stop member 12 until the rod 6 is again turned through 90°, so that in this way the stop member 12 cooperates with the rod 6 to maintain the latter connected with the upstanding portion 4 unless the operator wishes for some reason to remove the rod 6 from the upstanding portion which requires a further turning of the rod 6 through 90° so as to align the cross bar 8 with the cutout of the stop member 12.

The plate 4' whose right face cooperates with the nut 7 is fixed with a removable portion of the right wall of the upstanding portion 4 of the carriage, this removable wall portion resting against the right end of the hollow tubular member 22 which is fixedly carried within the upstanding portion 4 of the carriage. Suitable turnable clip members 23 are carried by the right wall of the upstanding portion 4 of the carriage to be movable to and from a position where they overlap the removable wall part 24 which is located within and fills a cutout in the right wall of the upstanding portion 4 of the carriage, so as to releasably maintain this wall portion 24 in position. Once the nut 7 has been loosened and the clips 23 turned away from their position overlapping removable wall portion 24, this removable wall portion can simply be moved with the rod 6 away from the upstanding portion 4 of the carriage 1, 2 so that with this arrangement it is possible to completely remove the rod 6 from the carriage.

Figure 4:
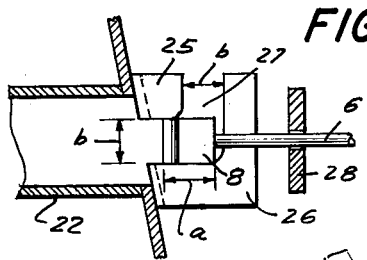
Fig. 4 is a fragmentary sectional side elevational view and showing a modified connection between the carrier and one of the carriages, differing from the structure shown in Fig. 2.

Instead of an arrangement as shown in Figs. 2 and 3, the stop member 12 may be eliminated and the right wall of the upstanding portion 4 of the carriage 1, 2 may be provided with a guide means which compels the rod 6 to be turned from a horizontal to a vertical position before the rod 6 can be removed from the carriage, and this construction is illustrated in Fig. 4. As may be seen from Fig. 4, a pair of members 25 and 26 of rigid strong material are fixed to the right end surface of the right wall of the upstanding portion 4 of the carriage 1, 2. A pair of similar members 25 and 26 are spaced from and parallel to the members 25 and 26 shown in Fig. 4, and the members 25 and 26 in Fig. 4 are located in a common vertical plane while the other pair of members 25 and 26 are also located in a common vertical plane, these two vertical planes being of course parallel to each other and defining between themselves the space through which the rod 6 is introduced into the elongated hollow portion 22 to move to the connecting portion 20 of the carrier 5. The parts 25 and 26 have edges which cooperate with each other to form a substantially L-shaped guide 27 which receives the end part of cross bar 8 when it is desired to remove the rod 6 from the carriage. The two vertical planes in which the plates 25 and 26 are located on both sides of the rod 6 are located nearer to each other than the length of the cross bar 8, and it is only possible for this cross bar 8 to move to the right beyond the right wall of the upstanding portion 4 of the carriage when the cross bar 8 is in the horizontal position indicated in Fig. 4. It will be noted that the dimension $a$ of the cross bar 8 is greater than the dimension $b$ thereof, and this dimension $b$ is in turn greater than the diameter of the rod 6, in the embodiment of Fig. 4. Since the plates 25, 26 on both sides of the rod 6 are spaced from each other by a distance less than the dimension $b$, it is only possible for the cross bar 8 to move into the guideways 27 which have a width equal to the dimension $b$. These guideways 27 which are located on both sides of the axis of the rod 6 and which are coextensive with each other are of a substantially L-shaped configuration so that it is necessary to move the rod 6 to the position shown in Fig. 4 and then to turn the rod 6 upwardly to a vertical position before the rod 6 can be removed from the assembly, so that this construction also guarantees against separation of the rod 6 from the assembly except when it is purposely desired to remove the rod 6.

As is shown in Fig. 4, the rod 6 carries a rigid strap 28 formed with an opening through which the rod 6 passes, and this strap 28 bridges the gap between the pair of walls 26 and engages the right edges thereof, as viewed in Fig. 4, so that the nut 7 may press against this strap 28 in order to pull the cross bar 8 up against the stop member 10 with the embodiment of Fig. 4.

Figure 5:
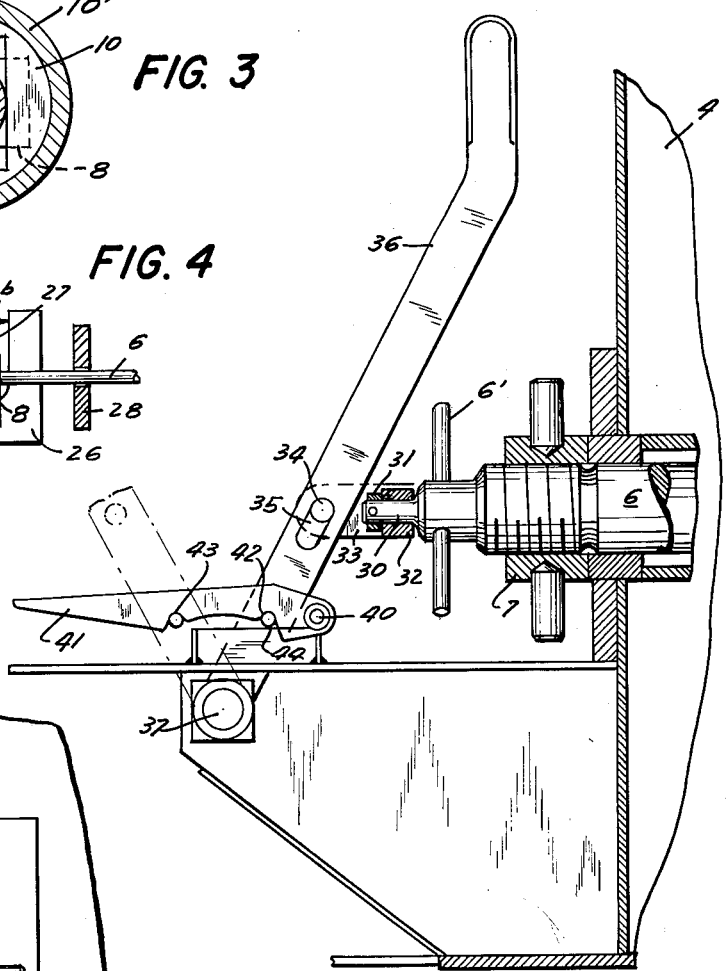
Fig. 5 illustrates a linkage which can be provided to cooperate with the structure of Fig. 2.

Fig. 5 shows a linkage which may be connected with the coupling means of Fig. 2 in order to shift the rod 6 between its connecting and disconnecting positions and in order to releasably maintain the rod 6 in either of these positions. Referring to Fig. 5, it will be seen that the rod 6 is provided beyond the lever 6' with an extension 30 carrying a collar 31, and this extension 30 extends through an annular member 32 fixed to and between a pair of plates 33 which support between themselves a pin 34 which extends through an elongated slot 35 of a manually turnable lever 36 which is pivoted at its bottom end on a pivot pin 37 carried by the upper part 2 of the carriage. Thus, the lever 36 may be turned between the solid and dot-dash line positions indicated in Fig. 5 for respectively locating the rod 6 in its connecting and disconnecting positions. Of course, before the lever 36 is turned by the operator to shift the rod 6 to its disconnecting position the nut 7 is loosened and the lever 6' is actuated to turn the rod 6 about its axis in the manner described above.

The carriage portion 2 carries a suitable bracket which itself fixedly carries a pivot pin 40 on which a lock arm 41 is pivotally mounted, and this lock arm is located beside lever 36 and is provided at its bottom edge with a pair of notches 42 and 43. The lever 36 carries a pin 44 which is fixed to the lever 36 in any suitable way as by being threaded into a threaded bore of the lever 36. When the lever 36 is in the solid line position indicated in Fig. 5 the lock arm 41 has a notch 43 receiving the pin 44 for releasably holding the lever 36 in the solid line position shown in Fig. 5, and in order to turn the lever 36 from its solid line position the operator first raises the lever 41 and then turns the lever 36 to the dot-dash line position after which the lever 41 is turned down so as to receive the pin 44 in the notch 43, and thus at this time the lock arm 41 serves to releasably hold the lever 36 in the position where the rod 6 is located in its disconnecting position.

Figure 6:
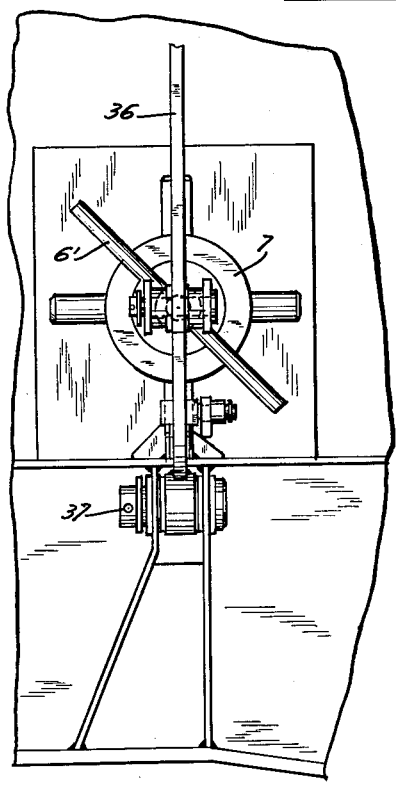
Fig. 6 is an end view of the structure of Fig. 5.

Fig. 6 is an end view of the structure of Fig. 5 and shows how there are in fact a pair of upstanding portions for the carriage 1, 2 cooperating with the carrier 5 and a pair of couplings and linkages cooperating therewith, as indicated in Fig. 6. In the same way, there are a pair of upstanding portions 4 with the embodiment of Figs. 1–3 as well as with the embodiment of Fig. 4, and the structure shown in Fig. 2 as well as the structure shown in Fig. 4 is duplicated on each carriage in the manner indicated in Fig. 6.

It is apparent that with the above described structure not only can the elongated carrier 5 be rapidly connected to and disconnected from the carriages 1, 2, but in addition the rods 6 are subject only to tensile forces since all compressive forces are absorbed by the abutment means 11 which cooperates with both the carrier 5 and each carriage. Thus it is possible to properly design the coupling means so that it will be able to stand the tensile forces and will not be called upon to withstand compressive forces.

As is apparent from Fig. 2 the carrier 5 has an end portion 5' resting on a plate 50 which is fixed to the top face of the upstanding portion 4.

It will be understood that each of the elements described above, or two or more together, may also find a useful application in other types of vehicle assemblies differing from the types described above.

While the invention has been illustrated and described as embodied in disconnectable and connectable vehicle assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A vehicle assembly comprising, in combination, a pair of carriage means spaced from each other; intermediate carrier means spanning the distance between said pair of carriage means and supported by said pair of carriage means; abutment means located between said carrier means and each of said carriage means and carried by one of said means, said abutment means, said carriage means and said carrier means having respectively interengaging surfaces cooperating with each other for limiting the movements of said pair of carriage means toward each other; and coupling means connecting said carrier means with each of said carriage means and absorbing only forces which tend to move said pair of carriage means away from each other so that said coupling means is stressed only in tension.

2. A vehicle assembly comprising, in combination, a pair of carriage means spaced from each other and including each a lower part adapted to roll along a pair of rails and an upper part carried by said lower part turnable about a vertical axis; intermediate carrier means spanning the distance between said pair of carriage means and being supported at opposite ends thereof by said upper parts of said carriage means, respectively; abutment means located between said carrier means and said upper parts of said carriage means, respectively, said abutment means, said carrier means, and said upper parts of said carriage means having respectively interengaging faces for limiting the movement of said carriage means towards each other; and coupling means operatively connected to said carrier means and each of said upper parts of said carriage means for tightening said abutment means between said carrier means and said upper parts of said carriage means and for connecting said carrier means with each of said carriage means so that said coupling means is stressed only in tension.

3. In a vehicle assembly, in combination, a pair of carriage units spaced from each other and having each an upstanding portion; a carrier unit spanning the distance between and being supported at opposite ends thereof on said upstanding portions of said carriage units, respectively, said carrier units having a connecting portion at each of said opposite ends thereof; a pair of abutment means respectively located between said opposite ends of said carrier unit and said carriage units and being each carried by one of said units, said abutment means and said units having respectively interengaging faces cooperating with each other for limiting movement of said carriage units toward each other and for absorbing all horizontal compression forces between said carrier unit and said carriage units; a pair of elongated rods having each one end located at one connecting portion of said carrier unit, and extending in longitudinal direction of said carrier unit from said connecting portion thereof through said upstanding portion of the carriage unit adjacent the respective connecting portion and having a threaded portion at the side of said upstanding portion of said carriage unit which is directed away from said connecting portion of said carrier unit; means located at said connecting portion of said carrier unit and cooperating with said one end of said rod for preventing movement of said end of said rod toward said upstanding portion of said carrier unit; and a nut threadedly carried by said threaded portion of said rod and pressing against said side of said upstanding portion which is directed away from said connecting portion of said carrier unit, whereby said abutment means will absorb all compression forces tending to move said carriage units and said carrier unit toward each other and said rods will absorb forces tending to move said upstanding portions of said carriage units and said connecting portions of said carrier unit away from each other, so that said rods are subjected only to tension forces.

4. In a vehicle assembly, in combination, a pair of carriage units spaced from each other and having each an upstanding portion; a carrier unit spanning the distance between and being supported at opposite ends thereof on said upstanding portions of said carriage units, respectively, said carrier unit having a connecting portion at each of said opposite ends thereof; a pair of elongated rods extending in longitudinal direction of said carrier unit through and being carried by said upstanding portions of said carriage units, respectively, said rods having respectively an end located at said connecting portions of said carrier unit and said end of each rod being in the form of a cross bar extending transversely with respect to the longitudinal axis of said rod, each of said rods being supported for axial movement by the upstanding portion of said carriage unit adjacent the respective connecting portion of said carrier unit and having a threaded portion located at the side of said carriage unit which is directed away from said adjacent connecting portion of said carrier unit; a pair of abutment means respectively located between said opposite ends of the carrier unit and said carriage units and being each carried by one of said units, said abutment means and said units having respectively engaging faces cooperating with each other for limiting movement of said carriage units toward each other and for absorbing all horizontal compression forces between said carrier unit and said carriage units; a pair of stop members fixedly carried by said connecting portions of said carrier unit, respectively, and being each formed with a cutout of substantially the same configuration as said cross bar, said rods extending respectively through said cutouts of said stop members and said cross bars being angularly displaced with respect to the respective cutout through approximately an angle of 90° so that when said cross bars respectively engage an end face of said stop members which is directed away from the upstanding portion of the respective carriage unit, said cross bars and stop members cooperate to prevent movement of said ends of said rods toward said upstanding portions of said carriage units; and nut means threadedly carried by said threaded portion of each of said rods and engaging respectively the side of said upstanding portion of the respective carriage unit which is directed away from the respective connecting portion of said carrier unit, whereby forces tending to move said carriage units and said carrier unit towards each other will be absorbed only by said abutment means and forces tending to move said upstanding portions of said carriage units and said connecting portions of said carrier unit away from each other will be absorbed only by said rods, so that said rods are subjected only to tension forces.

5. In a vehicle assembly, in combination, a pair of carriage units spaced from each other and having each an upstanding portion; a carrier unit spanning the distance between and being supported at opposite ends thereof on said upstanding portions of said carriage units, respectively, said carrier unit having a connecting portion at each of said opposite ends thereof; a pair of elongated rods extending in longitudinal direction of said carrier unit through and being carried by said upstanding portions of said carriage units, respectively, said rods having respectively an end located at said connecting portions of said carrier unit and said end of each rod being in the form of a cross bar extending transversely with respect to the longitudinal axis of said rod, each of said rods being supported for axial movement by the upstanding portion of said carriage unit adjacent the respective connecting portion of said carrier unit and having a threaded portion located at the side of said carriage unit which is directed away from said adjacent connecting portion of said carrier unit; a pair of abutment means respectively located between said opposite ends of the carrier unit and said carriage units and being each carried by one of said units, said abutment means and said units having respectively interengaging faces cooperating with each other for limiting movement of said carriage units toward each other and for absorbing all horizontal compression forces between said carrier unit and said carriage units; a pair of stop members fixedly carried by said connecting portions of said carrier unit, respectively, and being each formed with a cutout of substantially the same configuration as said cross bar, said rods extending respectively through said cutouts of said stop members and said cross bars being angularly displaced with respect to the respective cutout through approximately an angle of 90° so that when said cross bars respectively engage an end face of said stop members which is directed away from the upstanding portion of the respective carriage unit, said cross bars and stop members cooperate to prevent movement of said ends of said rods toward said upstanding portions of said carriage units; nut means threadedly carried by said threaded portion of each of said rods and engaging respectively the side of said upstanding portion of the respective carriage unit which is directed away from the respective connecting portion of said carrier unit, whereby forces tending to move said carriage units and said carrier unit towards each other will be absorbed only by said abutment means and forces tending to move said upstanding portions of said carriage units and said connecting portions of said carrier unit away from each other will be absorbed only by said rods, so that said rods are subjected only to tension forces; and a second stop member carried by said upstanding portion of each of said carriage units and being formed with a cutout identical with said cutout of said first-mentioned stop member, said rods extending through said cutouts of said second stop members, respectively, and said cutout of each of said second stop members being displaced through approximately 90° with respect to the cutout of the respective first-mentioned stop member, so that when the carrier unit is to be disconnected from the carriage units by loosening of said nut means, turning of said rods through approximately 90°, and movement of said cross bars at said ends of said rods through said cutouts of said first-mentioned stop members toward said upstanding portions of said carriage units, said cross bars will be engaged and held by said second stop members to prevent removal of said rods from said upstanding portions of said carriage units until said rods are again turned through approximately 90°.

6. In a vehicle assembly, in combination, a pair of carriage units spaced from each other and having each an upstanding portion; a carrier unit spanning the distance between and being supported at opposite ends thereof on said upstanding portions of said carriage units, respectively, said carrier unit having a connecting portion at each of said opposite ends thereof; a pair of elongated rods extending in longitudinal direction of said carrier unit through and being carried by said upstanding portions of said carriage units, respectively, said rods having respectively an end located at said connecting portions of said carrier unit and said end of each rod being in the form of a cross bar extending transversely with respect to the longitudinal axis of said rod, each of said rods being supported for axial movement by the upstanding portion of said carriage unit adjacent the respective connecting portion of said carrier unit and having a threaded portion located at the side of said carriage unit which is directed away from said adjacent connecting portion of said carrier unit; a pair of abutment means respectively located between said opposite ends of the carrier unit and said carriage units and being each carried by one of said units, said abutment means and said units having respectively interengaging faces cooperating with each other for limiting movement of said carriage units toward each other and for absorbing all horizontal compression forces between said carrier unit and said carriage units; a pair of stop members fixedly carried by said connecting portions of said carrier unit, respectively, and being each formed with a cutout of substantially the same configuration as said cross bar, said rods extending respectively through said cutouts of said stop members and said cross bars being angularly displaced with respect to the respective cutout through approximately an angle of 90° so that when said cross bars respectively engage an end face of said stop members which is directed away from the upstanding portion of the respective carriage unit, said cross bars and stop members cooperate to prevent movement of said ends of said rods toward said upstanding portions of said carriage units; nut means threadedly carried by said threaded portion of each of said rods and engaging respectively the side of said upstanding portion of the respective carriage unit which is directed away from the respective connecting portion of said carrier unit, whereby forces tending to move said carriage units and said carrier unit towards each other will be absorbed only by said abutment means and forces tending to move said upstanding portions of said carriage units and said connecting portions of said carrier unit away from each other will be absorbed only by said rods, so that said rods are subjected only to tension forces, said carrier unit and carriage units being separable from each other after loosening of said nut means, turning of said rods about its axis through approximately 90° and axial movement of said rods to move said cross bars thereof through said cutouts of said stop members toward said upstanding portions of said carriage units; and guide means carried by said upstanding portions of said carriage units for compelling said rods to be turned from a substantially horizontal position to a substantially vertical position before said rods can be removed from said upstanding portions of said carriage units.

7. In a vehicle assembly, in combination, a pair of carriage units spaced from each other and having each an upstanding portion; a carrier unit spanning the distance between and being supported at opposite ends thereof on said upstanding portions of said carriage units, respectively, said carrier unit having a connecting portion at each of said opposite ends thereof; a pair of elongated rods extending in longitudinal direction of said carrier unit through and being carried by said upstanding portions of said carriage units, respectively, said rods having respectively an end located at said connectiong portions of said carrier unit and said end of each rod being in the form of a cross bar extending transversely with respect to the longitudinal axis of said rod, each of said rods being supported for axial movement by the upstanding portion of said carriage unit adjacent the respective connecting portion of said carrier unit and having a threaded portion located at the side of said carriage unit which is directed away from said adjacent connecting portion of said carrier unit; a pair of abutment means respectively located between said opposite ends of the carrier unit and said carriage units and being each carried by one of said units, said abutment means and said units having respectively interengaging faces cooperating with each other for limiting movement of said carriage units toward each other and for absorbing all horizontal compression forces between said carrier unit and said carriage units; a pair of stop members fixedly carried by said connecting portions of said carrier unit, respectively, and being each formed with a cutout of substantially the same configuration as said cross bar, said rods extending respectively through said cutouts of said stop members and said cross bars being angularly displaced with respect to the respective cutout through approximately an angle of 90° so that when said cross bars respectively engage an end face of said stop members which is directed away from the upstanding portion of the respective carriage unit, said cross bars and stop members cooperate to prevent movement of said ends of said rods toward said upstanding portions of said carriage units; nut means threadedly carried by said threaded portion of each of said rods and engaging respectively the side of said upstanding portion of the respective carriage unit which is directed away from the respective connecting portion of said carrier unit, whereby forces tending to move said carriage units and said carrier unit towards each other will be absorbed only by said abutment means and forces tending to move said upstanding portions of said carriage units and said connecting portions of said carrier unit away from each other will be absorbed only by said rods, so that said rods are subjected only to tension forces, said carrier unit and said carriage units being separable from each other upon loosening of said nut means, turning of said rods through approximately 90° and axial shifting of said rods from a connecting position where said ends of said rods are respectively located at said connecting portions of said carrier unit to a disconnecting position where said ends of said rods are respectively located at said upstanding portions of said carriage units, said cross bars moving through said cutouts of said stop members during movement of said rods between said positions thereof; and linkage means carried by said carriage units and cooperating with said rods for axially shifting the latter between said positions thereof.

8. In a vehicle assembly, in combination, a pair of carriage units spaced from each other and having each an upstanding portion; a carrier unit spanning the distance between and being supported at opposite ends thereof on said upstanding portions of said carriage units, respectively, said carrier unit having a connecting portion at each of said opposite ends thereof; a pair of elongated rods extending in longitudinal direction of said carrier unit through and being carried by said upstanding portions of said carriage units, respectively, said rods having respectively an end located at said connecting portions of said carrier unit and said end of each rod being in the form of a cross bar extending transversely with respect to the longitudinal axis of said rod, each of said rods being supported for axial movement by the upstanding portion of said carrier unit and having a threaded portion located at the side of said carriage unit which is directed away from said adjacent connecting portion of said carrier unit; a pair of abutment means respectively located between said opposite ends of the carrier unit and said carriage units and being each carried by one of said units, said abutment means and said units having respectively interengaging faces cooperating with each other for limiting movement of said carriage units toward each other and for absorbing all horizontal compression forces between said carrier unit and said carriage units; a pair of stop members fixedly carried by said connecting portions of said carrier unit, respectively, and being each formed with a cutout of substantially the same configuration as said cross bar, said rods extending respectively through said cutouts of said stop members and said cross bars being angularly displaced with respect to the respective cutout through approximately an angle of 90° so that when said cross bars respectively engage an end face of said stop members which is directed away from the upstanding portion of the respective carriage unit, said cross bars and stop members cooperate to prevent movement of said ends of said rods toward said upstanding portions of said carriage units; nut means threadedly carried by said threaded portion of each of said rods and engaging respectively the side of said upstanding portion of the respective carriage unit which is directed away from the respective connecting portion of said carrier unit, whereby forces tending to move said carriage units and said carrier unit towards each other will be absorbed only by said abutment means and forces tending to move said upstanding portions of said carriage units and said connecting portions of said carrier unit away from each other will be absorbed only said rods, so that said rods are subjected only to tension forces, said carrier unit and said carriage units being separable from each other upon loosening of said nut means, turning of said rods through approximately 90° and axial shifting of said rods from a connecting position where said ends of said rods are respectively located at said connecting portions of said carrier unit to a disconnecting position where said ends of said rods are respectively located at said upstanding portions of said carriage units, said cross bars moving through said cutouts of said stop members during movement of said rods between said positions thereof; linkage means carried by said carriage units and cooperating with said rods for axially shifting the latter between said positions thereof; and releasable locks means cooperating with said linkage means for releasably maintaining the latter either in the position where said linkage means locate said rods in said connecting positions thereof or in the positions where said linkage means locate said rods in said disconnecting positions thereof.

References Cited in the file of this patent

UNITED STATES PATENTS

| | | |
|---|---|---|
| 1,864,572 | Willoughby | June 28, 1932 |
| 2,513,552 | Dove | July 4, 1950 |
| 2,709,969 | Andert | June 7, 1955 |